(12) United States Patent
Walker et al.

(10) Patent No.: US 8,555,372 B2
(45) Date of Patent: Oct. 8, 2013

(54) AUTOMATIC FIREWALL CONFIGURATION (75) Inventors: Phillip M. Walker, Fort Collins, CO (US); Fred Charles Thomas, Fort Collins, CO (US); Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 12/865,236

(22) PCT Filed: Jun. 30, 2008

(86) PCT No.: PCT/US2008/068737
§ 371 (c)(1),
(2), (4) Date: Jul. 29, 2010

(87) PCT Pub. No.: WO2010/002381
PCT Pub. Date: Jan. 7, 2010

(65) Prior Publication Data
US 2010/0325718 A1    Dec. 23, 2010

(51) Int. Cl.
*G06F 9/00* (2006.01)
*G06F 15/16* (2006.01)
*G06F 17/00* (2006.01)

(52) U.S. Cl.
USPC ......................................................... 726/12

(58) Field of Classification Search
USPC .......................................................... 726/12
See application file for complete search history.

(56) References Cited

U.S. PATENT DOCUMENTS

| | | | |
|---|---|---|---|
| 4,897,874 A * | 1/1990 | Lidinsky et al. | 726/13 |
| 6,012,088 A * | 1/2000 | Li et al. | 709/219 |
| 6,170,012 B1 * | 1/2001 | Coss et al. | 709/229 |
| 6,954,790 B2 * | 10/2005 | Forslow | 709/227 |
| 7,047,560 B2 | 5/2006 | Fishman | |
| 7,240,364 B1 * | 7/2007 | Branscomb et al. | 726/9 |
| 7,577,735 B1 * | 8/2009 | De Groote et al. | 709/224 |
| 7,633,948 B2 * | 12/2009 | Yokomitsu et al. | 370/395.54 |
| 7,890,610 B2 * | 2/2011 | Oeda et al. | 709/220 |
| 7,904,550 B2 * | 3/2011 | Sakamoto et al. | 709/224 |
| 8,402,122 B2 * | 3/2013 | Cho et al. | 709/222 |
| 2002/0069278 A1 * | 6/2002 | Forslow | 709/225 |
| 2002/0069356 A1 | 6/2002 | Kim | |
| 2002/0144151 A1 * | 10/2002 | Shell et al. | 713/201 |
| 2003/0177389 A1 * | 9/2003 | Albert et al. | 713/201 |

(Continued)

FOREIGN PATENT DOCUMENTS

WO    WO 2007/073814 A1 *   7/2007

OTHER PUBLICATIONS

UPnP Forum, UPnP Device Architecture 1.0, Jul. 20, 2006.*

*Primary Examiner* — Brian P Whipple (57) ABSTRACT

In one example a method is provided. The method includes (i) discovering, by a gateway router, a server in a local area network, wherein the gateway router discovers the server by sending a universal plug and play (UPnP) message identifying the gateway router as a gateway router with access configurable by the server; (ii) receiving, by the gateway router, a response from the server, wherein the response identifies the server as a server that desires to establish external access; (iii) determining, by the gateway router, whether the server is a trustworthy server, wherein determining comprises comparing information received by the server with a stored list of trustworthy servers; (iv) configuring, by the gateway router, a logical port to forward incoming connection requests to the server; and (v) forwarding, by the gateway router, incoming connection requests to the server.

18 Claims, 4 Drawing Sheets

(56) References Cited

U.S. PATENT DOCUMENTS

| | | | |
|---|---|---|---|
| 2004/0103318 A1* | 5/2004 | Miller et al. | 713/201 |
| 2005/0021603 A1* | 1/2005 | Yokomitsu et al. | 709/203 |
| 2005/0041596 A1* | 2/2005 | Yokomitsu et al. | 370/252 |
| 2005/0192923 A1* | 9/2005 | Nakatsuka | 707/1 |
| 2005/0210155 A1* | 9/2005 | Oeda et al. | 709/249 |
| 2006/0143693 A1* | 6/2006 | Glickman | 726/3 |
| 2006/0168238 A1* | 7/2006 | Massam et al. | 709/227 |
| 2006/0280127 A1 | 12/2006 | Mizuno et al. | |
| 2008/0209036 A1* | 8/2008 | Sakamoto et al. | 709/224 |
| 2009/0182853 A1* | 7/2009 | Cho et al. | 709/222 |

\* cited by examiner

AUTOMATIC FIREWALL CONFIGURATION

BACKGROUND

When a small Local Area Network (LAN), such as a domestic network in a private residence, is linked to a larger network such as the internet, the link is often through a gateway router acting as a firewall. One of the functions of the firewall is to protect the LAN from intrusion from outside. In order to fulfill this function, firewall routers, especially firewall routers that are likely to be used by relatively technically unsophisticated users, tend to be preconfigured by their manufacturers to be very unwelcoming to unexpected communications from outside. Typically, the firewall is configured not to allow any internet connection that is initiated from the outside.

Gateway routers are available that can be configured using the "Universal Plug and Play" (UPnP) protocol by a server (or other device on the protected side of the gateway) to forward incoming connections. However, most router manufacturers turn that function off by default, for security reasons. The user could enable that function by configuring the router manually, or could configure the router manually to allow a connection on a specific port to a specific router on the protected side of the gateway, but such configuration requires a degree of sophistication in the operation of computer networks.

However, some users do wish to allow at least limited access to their LANs from outside, for example, to a server. Many users who wish to permit an incoming connection to a home server or other server on a small LAN do not have, and do not wish to have to acquire, the technical skill and knowledge to configure a router manually.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain aspects of the invention.

In the drawings.

DETAILED DESCRIPTION

Reference will now be made in detail to various embodiments of the present invention, examples of which are illustrated in the accompanying drawings.

Figure 1:
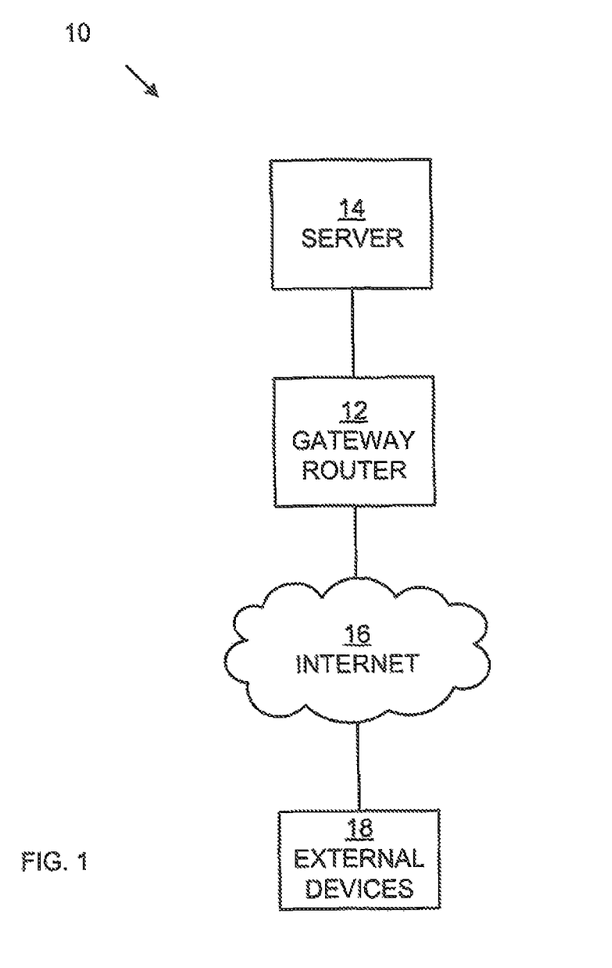
FIG. 1 is a diagram of an embodiment of a computer network.

Referring to the accompanying drawings, and initially to FIG. 1, one embodiment of a computer network, indicated generally by the reference numeral 10, is a Local Area Network (LAN) such as may be installed in a small business or private residence.

The LAN 10 comprises a gateway router 12, connected on a "local" or "protected" side of the router to a server 14, and on an "outside" to an external Wide Area Network (WAN) 16 such as the Internet, and through the WAN to external devices 18. The server 14 may be a Personal Computer (PC) or may be a dedicated server. The server 14 may be a "home server," which is typically a dedicated server without a console that acts largely as a repository of files for other devices such as PCs (not shown) that may be present on the LAN 10. The term "computer" as used herein includes personal computers, servers, and home servers.

In the embodiment shown in FIG. 1, the gateway router 12 may be configured to permit outgoing connections to external devices 18 from various devices on the LAN 10, but configured to permit incoming connections only to the server 14.

Figure 2:
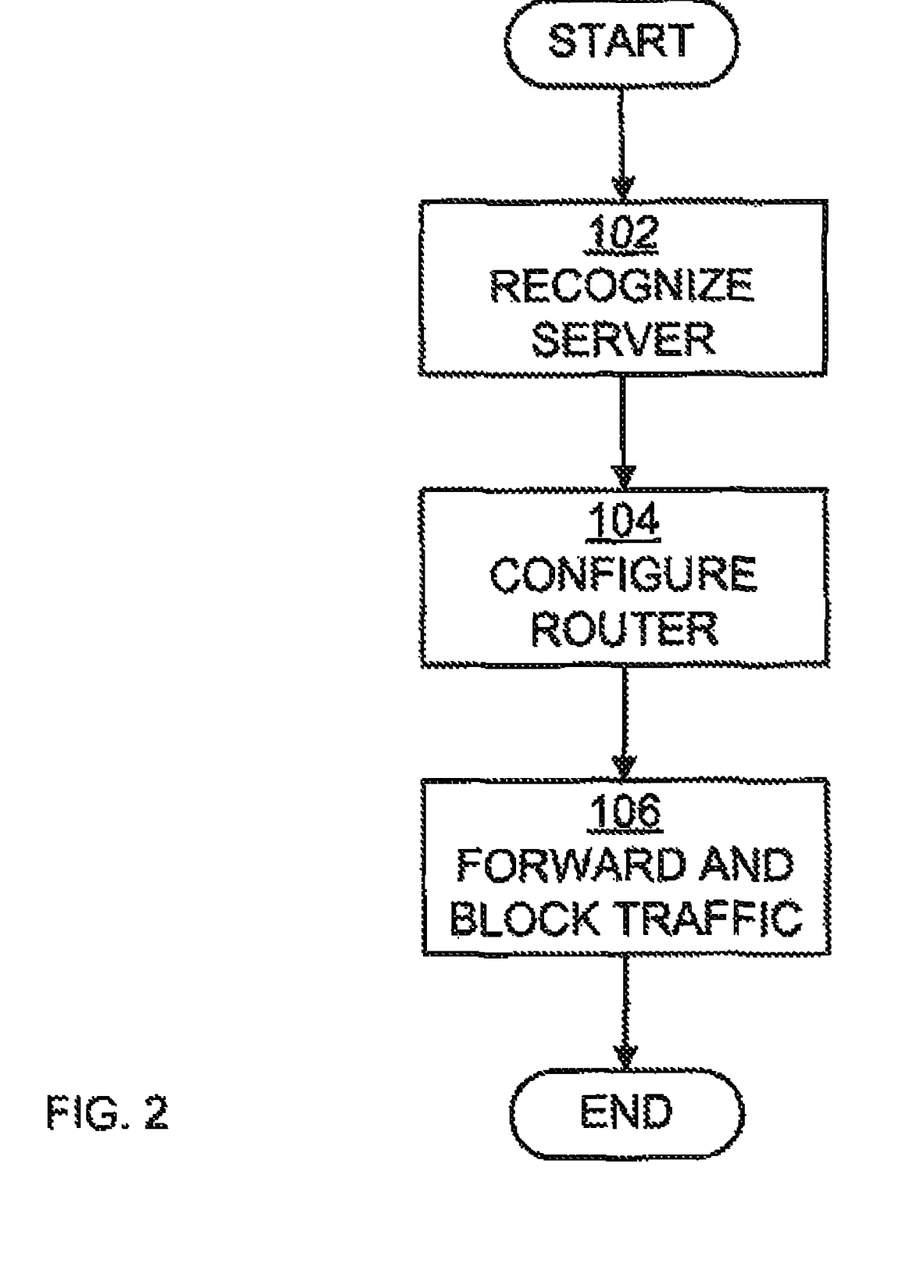
FIG. 2 is a flowchart of an embodiment of the invention.

Referring now also to FIG. 2, in one embodiment the gateway router 12 is programmed to configure itself automatically.

In step 102, the router 12 recognizes that the server 14 is present on the LAN 10, and is a trustworthy server.

In step 104, the router 12 configures itself to accept at least some incoming connection requests from the WAN 16 for the server 14, and to reject incoming connection requests from the WAN 16 that are not for the server 14.

In step 106, the router 12 and the server 14 operate together with any other devices (not shown) that happen to be active on the LAN 10. The router 12 forwards eligible incoming connections from the WAN 16 to the server 14, blocks or discards other incoming connections from the WAN 16, but may forward outgoing connections from the server 14, from other devices on the LAN 10, or both.

Figure 3:
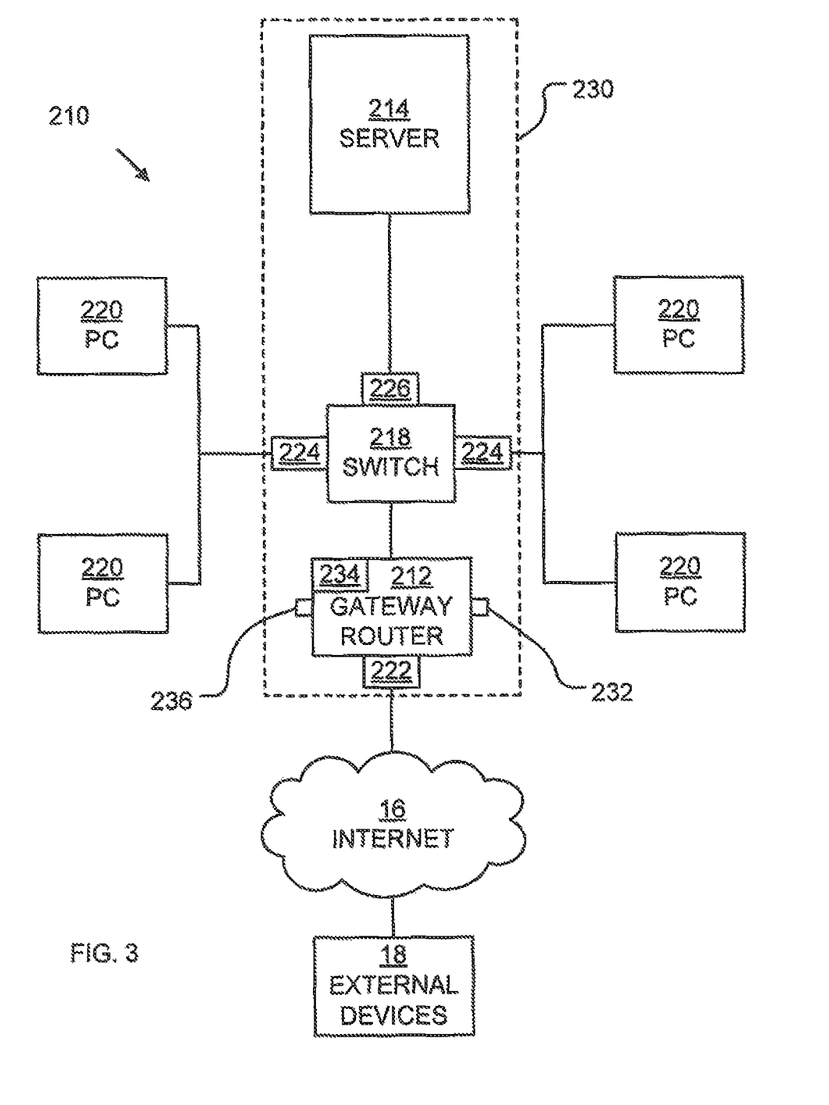
FIG. 3 is a diagram of another embodiment of a computer network.

Referring to FIG. 3, a second embodiment of a computer network, indicated generally by the reference numeral 210, is a Local Area Network (LAN) such as may be installed in a small business or private residence.

The LAN 210 comprises a gateway router 212, connected to various devices on the LAN on a "local" or "protected" side, and to external devices 18 on an external network such as the Internet 16 on an "outside." The devices on the LAN 210 comprise at least one server 214 and some Personal Computers (PCs) 220, connected to each other and to the gateway router 212 by a switch 218, hub, or the like.

The server 214 may also be a PC, or may be a dedicated server. The server 214 may be a "home server," which is typically a dedicated server without a console that acts largely as a repository of files for the other PCs 220 on the LAN 210. Such a home server 214 is useful if the PCs 220 include portable computers that may not always be connected to the network. Then, files stored on the home server 214 can be constantly available to devices on the LAN 210, where files stored on a PC 220 would be available only when that specific PC was connected to the network and switched on.

The gateway router 212 and the switch 218 may be a single device, or separate devices designed to operate together, with one physical external port 222 and a plurality of physical local ports 224, 226. The physical local ports 226 may include a dedicated physical port 226 for linking to the server 214.

The gateway router 212 and the server 214 may be in a single housing 230, with the server linked to the router by the manufacturer. In that case, the gateway router 212 may be preconfigured by the manufacturer to recognize only the server 214 in the same housing as a trustworthy server, for example, because the server is connected to the dedicated physical port 226 or because the gateway router is provided with a list of trustworthy servers containing only a unique identifier for that specific server.

Figure 4:
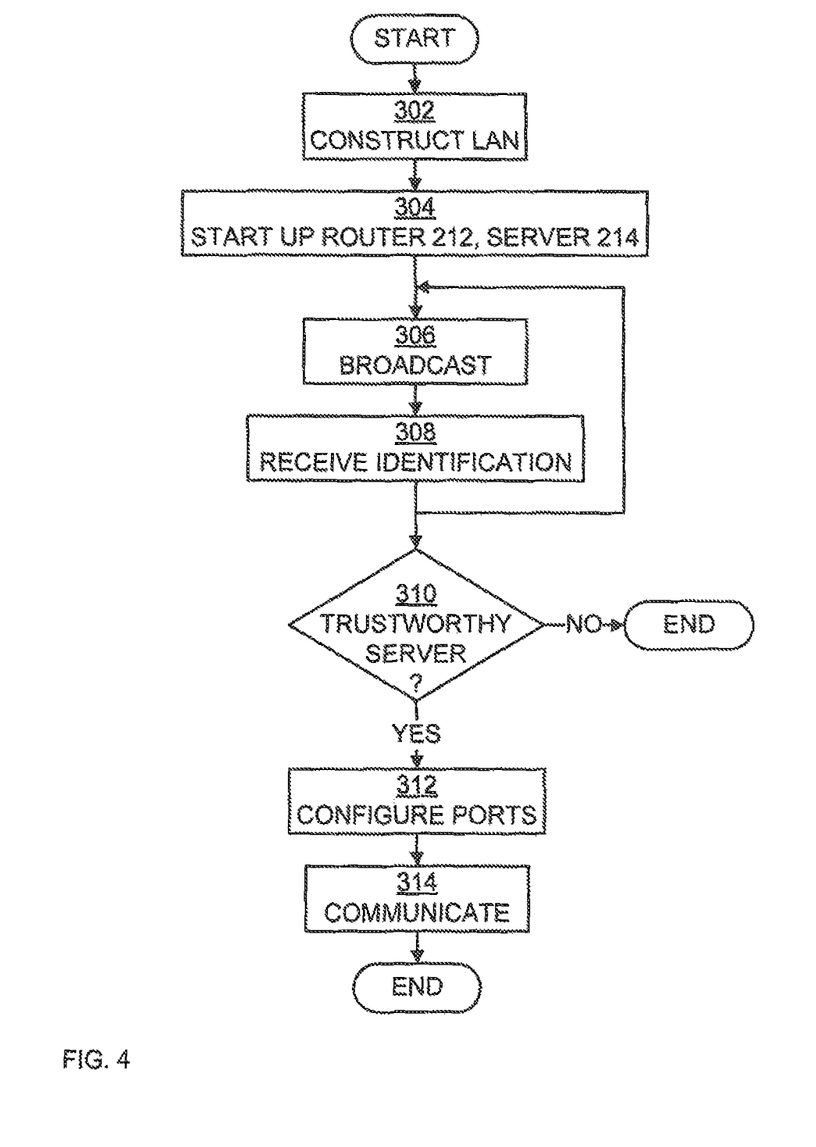
FIG. 4 is a flowchart of another embodiment of the invention.

Referring now to FIG. 4, in one embodiment of a process for configuring a gateway router such as the router 212 shown in FIG. 3, in step 302 the LAN 210 is physically constructed and connected. In step 304, the router 212 and the server 214, together with the switch 218 are started up. Once the router 212, the server 214, and the switch 218 are running, communication is established between them in an appropriate manner, which may include manners already known in the art.

In step 306 the gateway router 212, as a late stage in its startup routine, "discovers" the other devices on the LAN 210, including any server 214. In an embodiment, the gateway router 212 sends out a broadcast message announcing itself as a router newly added to the network, to which other devices respond. The broadcast may be, for example, a uPnP broadcast including a device-type identifier. Where a suitable device-type identifier is available, the broadcast message may specifically identify the router 212 as a router with access configurable by a home server. If such a specific device type is not available, a more generic device-type identifier may be used.

In step 308, the server 214 identifies itself. Where a suitable device-type identifier is available, the response by the server 214 may specifically identify the server 214 as a home server with a need to establish external access. If such a specific device type is not available, a more generic device-type identifier may be used. As shown by the loop in FIG. 4, if the initial broadcast and response do not provide sufficient information about the server 214, the router may interrogate one or more possible servers repeatedly until sufficient information is available. At the first iteration of step 308, the server 214 may merely provide a uPnP server device type. It is proposed to extend the available uPnP device types to allow more specific identification of, for example, a "home server" type and a "configurable router" type. Alternatively, the router could be defined as an extension or subclass of the existing "Internet Gateway Device" type, which includes some configurable implementations.

Alternatively, if the server 214 is started up after the router 212, the server may, as a late stage in its startup procedure, broadcast an announcement that it is a server, to which the router 212 reacts.

Where the router 212 knows that a dedicated physical server port 226 is in use, the router may broadcast to and interrogate only devices accessible through the dedicated physical server port.

Steps 306 and 308 may take place in a single transaction, or may take place over two or more distinct transactions. For example, communication between the server 214 and the gateway router 212 may be established at one time, as a result of the server being provided with the routers network address by DHCP, static server configuration, or another suitable process. At a later time, the server 214 may interrogate the gateway router 212 to establish whether the router is configurable by the server.

In step 310, the router 212 determines that the server 214 is a trustworthy server by comparing the information obtained in steps 306 and 308 with a list 234 of approved trustworthy servers stored on a computer readable storage medium in the router 212. The list 234 may consist of device type identifiers for devices that may serve as home servers, to a desired degree of specificity. The list 234 may consist of unique identifiers, which may be in the form of ranges of unique identifiers, for devices that may serve as home servers. By limiting the types of devices that can be recognized as servers in subsequent steps, this embodiment blocks or restricts some vulnerabilities caused by malware on other types of device that may attempt to masquerade as a server. For example, even on a new LAN 210, some of the PCs 220 may not be new, and may previously have been exposed to infiltration by malware.

The type identifiers may include server hardware identifiers, server software identifiers, or both. Where the router 212 and the server 214 are pre-assembled in a single housing 230, the list 234 may consist solely of the type identifier, or even an individual device identifier, of the server 214 actually present.

In an embodiment, the router 212 may request additional confirmation of the identity of the server 214. For example, the list 234 may include public keys for encryption programs on approved servers 214, and the router 212 may then verify the authenticity of the server by the servers ability to decrypt a message encrypted using the appropriate public key.

In a alternative embodiment, the router 212 requests a user to confirm to the router that a trustworthy server 214 is present. Devices such as the router 212 usually do not have a full user interface. However, the router 212 may have various indicator lights 232 and a few pushbuttons or other controls 236, allowing limited communication with a user who has an instruction sheet explaining the significance of distinctive signals, such a patterns of flashing lights. Thus, the router 212 can ask a user to confirm or deny the presence of a trustworthy server 214 by pressing a specified button 236 in response to a specified light signal 232. If the physical ports on a combined router 212 and switch 218 have individual indicator lights 232, the router 212 can even ask the user which port the server 214 is attached to.

Alternatively, where the router 212 and the server 214 are pre-assembled in a single housing 230, step 310 may be omitted on the assumption that the server 214 actually present in the housing 230 is the server intended to be present, and steps 306 and 308 may then be a mere handshake.

If no trustworthy router 214 is identified, the process terminates.

In step 312, the gateway router 212 configures its gateway to forward incoming connection requests on specified logical ports to the trustworthy router 214, and to deny incoming connection requests on other ports. The allowed logical ports may be standard IP ports preconfigured in the router 212, or may be specified in the list 234 for a particular server type, or the router 212 may accept requests from a recognized trustworthy server 214 to open ports specified by the server, either from a choice specified in the list 234 or without restriction.

In a preferred embodiment, the router 212 does not accept any request from a device other than the recognized trustworthy server 214 to open ports for incoming connections, and does not accept requests from the recognized trustworthy server to open ports inconsistent with the choice specified in the list 234 or other restrictions preconfigured into the router 212.

In a preferred embodiment, the router 212 accepts requests from the server 214 to open logical ports only as part of the initial configuration of the LAN 210. At that time, it is assumed that the configuration of the LAN 210 is likely to be clean, and that malware has probably not yet had an opportunity to become established on the server 214. A request for a new logical port at a later time, especially an unusual logical port, is more likely to be part of an attempt by malware that has got onto the server 214 to open up the LAN to attack, and is not accepted.

In case more than one trustworthy server 214 is present on the LAN 210, the server 214 may as part of step 312 obtain the existing configuration status of a desired logical port of the router 212 using a standard GetSpecificPortMappingEntry() or similar command. If the desired port is already configured to connect to another server 214, the requesting server may work down a list of suitable ports unless and until it finds an available port. Alternatively, if two or more servers 214 are present on the LAN 210, they may discover each, and may negotiate to ensure they do not attempt to configure the same logical port.

In step 314, the router 212 routes connections. The router 212 routes incoming connections from external devices 18 on the open logical ports to the server 214, and denies all other incoming connections. The router 212 may permit outgoing connections both from the server 214 and from the PCs 220.

Various modifications and variations can be made in the present invention without departing from the spirit or scope of the invention. Thus, it is intended that the present invention cover the modifications and variations of this invention provided they come within the scope of the appended claims and their equivalents.

For example, in FIG. 3, one server 214 and a few PCs 220 are shown connected to the switch 218 and then to the router 212. The specific configuration of the LAN 210 may vary from installation to installation and, as mentioned above, may vary from time to time if, for example, some of the PCs 220 are portable devices that are only intermittently connected to the LAN.

For example, depending on exactly how the subsequent configuration is managed, the router 212 and the server 214 may be started up in a specific order in step 304. For example, if the configuration process relies on one device sending out or receiving certain signals as part of its startup routine, that device may be started up only after another device that is to respond to or broadcast those signals.

The exact procedure in steps 306 and 308 depends on the specific identification protocols available on the LAN 210. For example, the broadcast signal in step 306 may be able to request responses from only servers, or may request responses from all devices on the LAN, or something in between. The responses may sufficiently identify the responding devices sufficiently for step 308, or the router 212 may extract a shortlist of potential servers that are then interrogated individually for more detailed identification information.

What is claimed is:

1. A method comprising:
    discovering, by a gateway router, a server in a local area network, wherein the gateway router discovers the server by sending a universal plug and play (UPnP) message identifying the gateway router as a gateway router with access configurable by the server, wherein the gateway router sends the UPnP message only through a dedicated physical server port;
    receiving, by the gateway router, a response from the server, wherein the response identifies the server as a server that desires to establish external access;
    determining, by the gateway router, whether the server is a trustworthy server, wherein determining comprises comparing information received by the server with a stored list of trustworthy servers;
    configuring, by the gateway router, a logical port to forward incoming connection requests to the server; and
    forwarding, by the gateway router, incoming connection requests to the server.

2. The method of claim 1, wherein the gateway router only forwards incoming connection requests associated with the configured logical port, and denies incoming connection requests associated with other logical ports.

3. The method of claim 1, further comprising: confirming, by the gateway router, the identity of the server by requesting the server to decrypt an encrypted message.

4. The method of claim 1, further comprising: confirming, by the gateway router, the identity of the server by requesting a user to provide a confirmation that the server is trustworthy.

5. A method comprising:
    discovering, by a gateway router, a server in a local area network, wherein the gateway router discovers the server by sending a universal plug and play (UPnP) message identifying the gateway router as a gateway router with access configurable by the server;
    receiving, by the gateway router, a response from the server, wherein the response identifies the server as a server that desires to establish external access;
    determining, by the gateway router, whether the server is a trustworthy server, wherein determining comprises comparing information received by the server with a stored list of trustworthy servers;
    configuring, by the gateway router, a logical port to forward incoming connection requests to the server; and
    forwarding, by the gateway router, incoming connection requests to the server;
    wherein the gateway router and the server are integrated in a single device, and the list of trustworthy servers comprises only an identifier associated with the server.

6. A method comprising:
    discovering, by a gateway router, a server in a local area network, wherein the gateway router discovers the server by sending a message through a dedicated physical server port, and wherein the message comprises an identifier associated with the gateway router, wherein the gateway router sends the message only through the dedicated physical server port;
    receiving, by the gateway router, a response from the server, wherein the response comprises an identifier associated with the server;
    determining, by the gateway router, whether the server is a trustworthy server, wherein determining comprises comparing information received by the server with a stored information;
    configuring, by the gateway router, a port to forward incoming connection requests to the server; and
    forwarding, by the gateway router, incoming connection requests to the server via the configured port.

7. The method of claim 6, wherein the identifier associated with the gateway router and the identifier associated with the server are device-type identifiers.

8. The method of claim 6, wherein the gateway router only forwards incoming connection requests associated with the configured port, and denies incoming connection requests associated with other ports.

9. The method of claim 6, wherein the port is a logical port.

10. The method of claim 6, further comprising: confirming, by the gateway router, the identity of the server by requesting the server to conduct an authentication operation.

11. A method comprising:
    discovering, by a gateway router, a server in a local area network, wherein the gateway router discovers the server by sending a broadcast message with identification information about the gateway router, wherein the gateway router sends the broadcast message through a dedicated physical server port on the gateway router;
    receiving, by the gateway router, a response from the server, wherein the response comprises identification information about the server;
    determining, by the gateway router, whether the server is a trustworthy server, wherein determining comprises comparing the identification information about the server with a stored information;
    configuring, by the gateway router, a port to forward incoming connection requests to the server; and
    forwarding, by the gateway router, incoming connection requests to the server.

12. The method of claim 11, wherein the broadcast message is a universal plug and play (UPnP) broadcast message.

13. The method of claim 11, wherein the information about the server indicates that the server desires to establish external access.

14. The method of claim 11, wherein the stored information comprises a list of trustworthy servers.

15. The method of claim 11, wherein the port is a logical port.

16. The method of claim 11, wherein the gateway router only forwards incoming connection requests associated with the port, and denies incoming connection requests associated with other ports.

17. The method of claim 11, wherein the server is a home server.

18. The method of claim 11, further comprising at least one of:

confirming, by the gateway router, the identity of the server by requesting the server to decrypt an encrypted message; and     confirming, by the gateway router, the identity of the server by requesting a user to provide a confirmation that the server is trustworthy.

\* \* \* \* \*

UNITED STATES PATENT AND TRADEMARK OFFICE
CERTIFICATE OF CORRECTION

| | | |
|---|---|---|
| PATENT NO. | : 8,555,372 B2 | Page 1 of 1 |
| APPLICATION NO. | : 12/865236 | |
| DATED | : October 8, 2013 | |
| INVENTOR(S) | : Philip M. Walker et al. | |

It is certified that error appears in the above-identified patent and that said Letters Patent is hereby corrected as shown below:

Title page, item (75), Inventors, in column 1, line 1, delete "Phillip" and insert -- Philip --, therefor.

Signed and Sealed this
Twenty-first Day of October, 2014

Michelle K. Lee
*Deputy Director of the United States Patent and Trademark Office*